(12) United States Patent
Myers et al.

(10) Patent No.: US 6,955,036 B2
(45) Date of Patent: Oct. 18, 2005

(54) MOWER DECK BUMPER

(75) Inventors: James W. Myers, Eden Prairie, MN (US); James C. Doring, Apple Valley, MN (US)

(73) Assignee: Jrco, Inc., Minneapolis, MN (US)

(*) Notice: Subject to any disclaimer, the term of this patent is extended or adjusted under 35 U.S.C. 154(b) by 0 days.

(21) Appl. No.: 10/801,418

(22) Filed: Mar. 15, 2004

(65) Prior Publication Data

US 2004/0182063 A1 Sep. 23, 2004

Related U.S. Application Data

(60) Provisional application No. 60/455,504, filed on Mar. 18, 2003.

(51) Int. Cl.[7] .............................................. A01D 67/00
(52) U.S. Cl. ................................................... 56/320.1
(58) Field of Search .............................. 56/320.1, 17.4, 56/17.1, 17.2, 256, DIG. 9, DIG. 24; 293/102, 132, 107, 120; 172/13, 15, 20, 16, 17

(56) References Cited

U.S. PATENT DOCUMENTS

| | | | | |
|---|---|---|---|---|
| 1,342,393 A | * | 6/1920 | Read ........................... | 293/153 |
| 2,488,140 A | * | 11/1949 | Phillips et al. ................ | 56/17.2 |
| 3,560,922 A | * | 2/1971 | Wilson ........................ | 340/436 |
| 4,730,690 A | * | 3/1988 | McNutt et al. ............. | 180/274 |
| 5,425,224 A | * | 6/1995 | Downey et al. ............. | 56/15.8 |
| 6,223,510 B1 | * | 5/2001 | Gillins et al. ................ | 56/15.1 |
| 6,443,509 B1 | * | 9/2002 | Levin et al. ................... | 293/4 |

* cited by examiner

*Primary Examiner*—Árpáp F Kovács
(74) *Attorney, Agent, or Firm*—Merchant & Gould P.C.

(57) ABSTRACT

The present invention relates to a bumper for use with a mower deck. The bumper may include an elongate strip of material having first and second ends and a bend section extending between the first and second ends. The bumper is configured so that at least the first end of the bumper is capable of being secured to a mower deck with the bend section positioned over at least a portion of a trim surface of the mower deck. The bend section of the bumper is capable of absorbing forces when brought into contact with an object that would otherwise contact the trim surface.

7 Claims, 3 Drawing Sheets

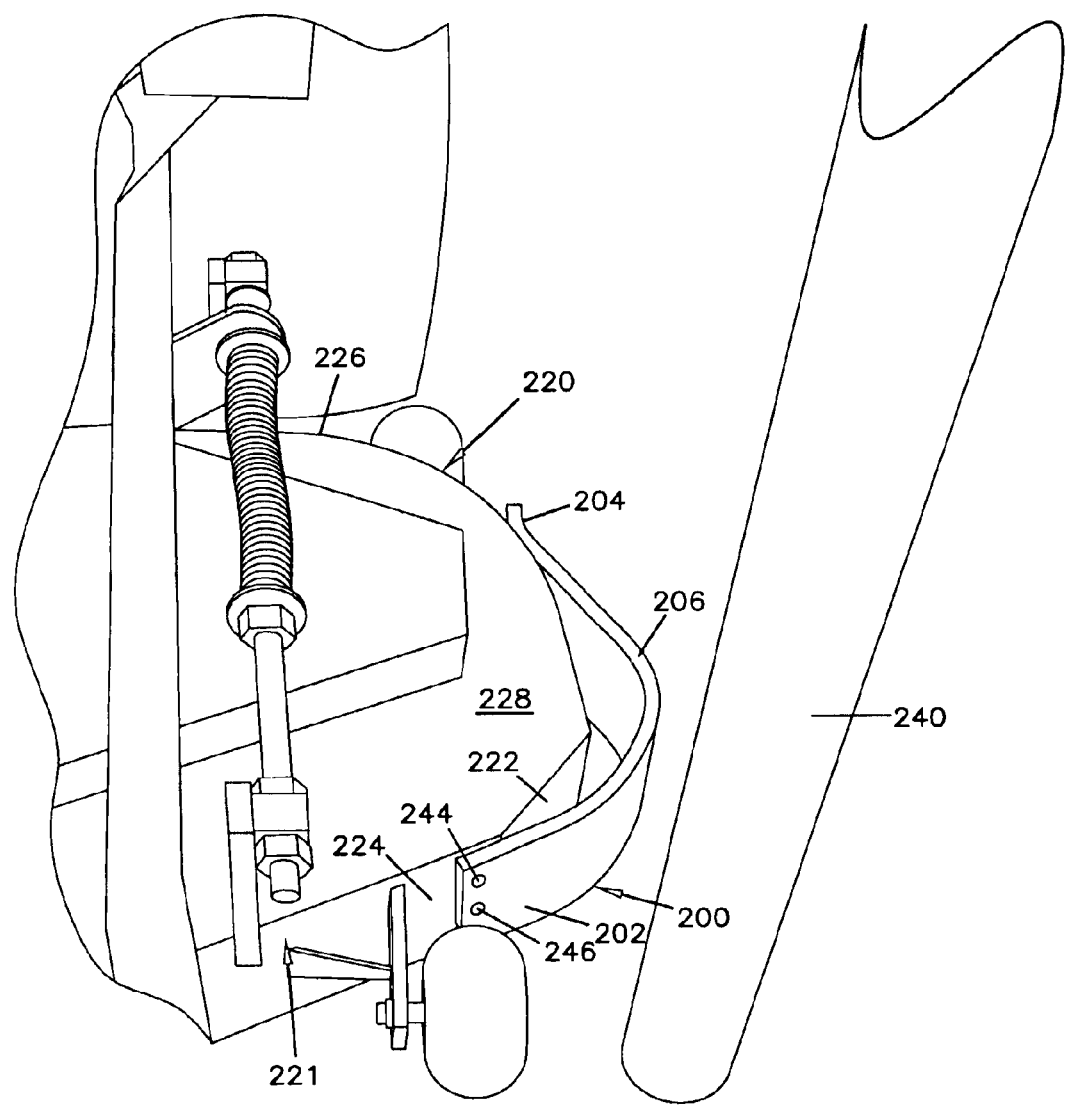

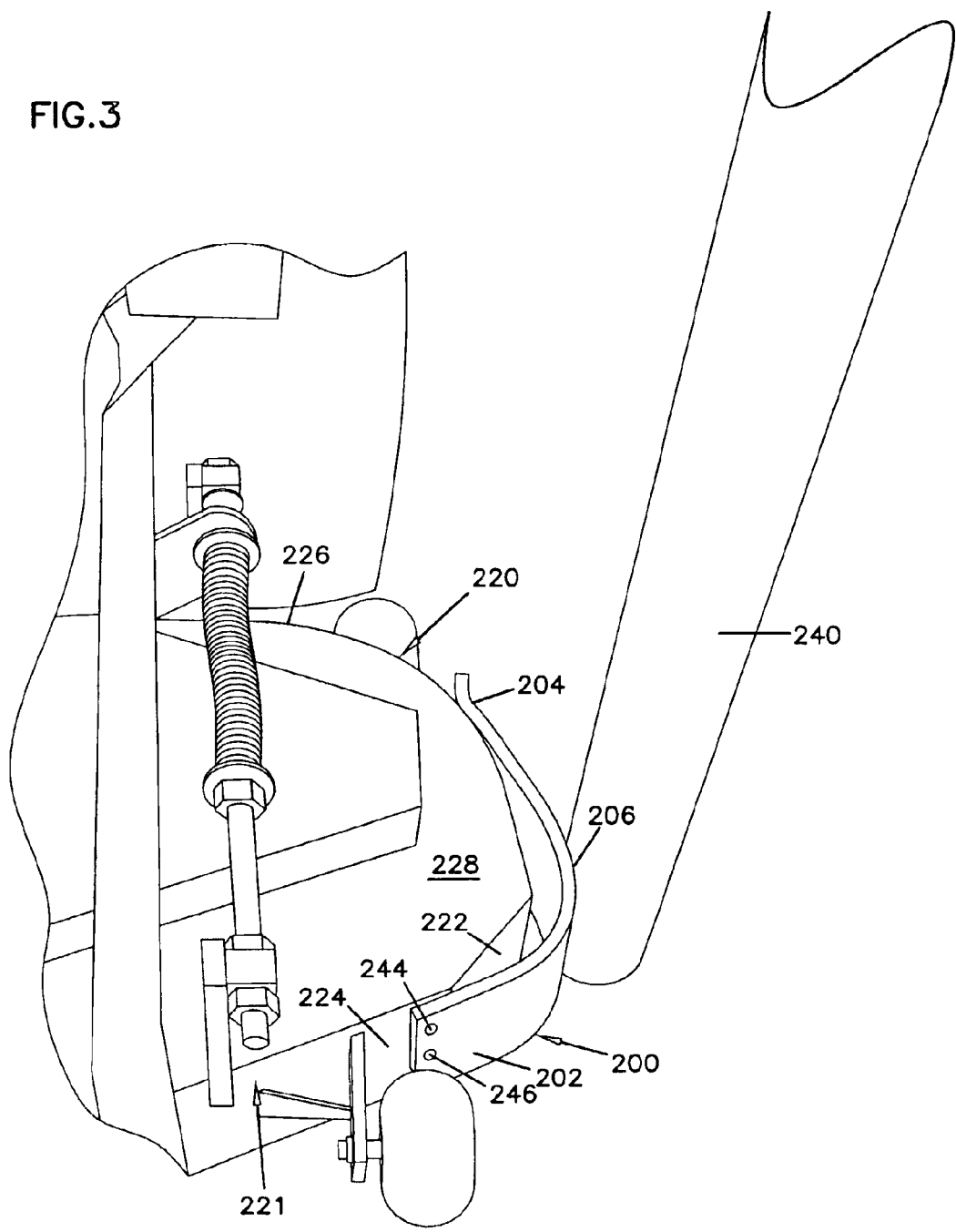

MOWER DECK BUMPER

CROSS REFERENCE TO RELATED APPLICATIONS

This application claims priority to U.S. Provisional Patent Application Ser. No. 60/455,504 entitled MOWER DECK BUMPER and filed on Mar. 18, 2003, which provisional application is incorporated herein by reference in its entirety.

BACKGROUND OF THE INVENTION

1. Field of the Invention

The present invention relates to bumper members, and more particularly relates to bumper members for mowers and other yard equipment.

2. Related Art

Many types of motorized yard equipment include a contact surface that frequently engages other objects such as trees, posts, sprinklers, buildings, etc. during use of the equipment. An example piece of equipment with such a contact surface is a lawn mower. Lawn mowers typically include a mowing deck that houses the mower blades. A mower deck typically has a one side that is at least partially open for expelling cut grass from under the mower deck and a trim side with an exposed trim surface that may be used to cut grass around objects. Some mowers have multiple trim surfaces around the mower deck when the mower mulches the grass or expels the cut grass out the rear of the mower. Some mower decks that are positioned at the front or rear of the mower, and thus include trim surfaces that extend around the front, rear and sides of the mowing deck.

Mowers are often required to cut grass around various objects. For example, mowers are commonly used to cut grass around objects such as trees and bushes, headstones in cemeteries, landscaping, buildings, sprinkler heads, fences, etc. using the trim surface of the mower deck. When mowing around objects, the trim surface and the objects commonly come into contact with each other. As a result of the repetitious trimming around such objects and the ensuing contact between the trim surface and the objects, the trim surface of the mower deck may experience extensive wear or failure in some instances, and the object may be damaged in other instances.

SUMMARY OF THE INVENTION

The present invention relates to bumper structures for use with yard equipment such as with a mowing deck of a mower. One aspect of the invention relates to a mower deck bumper that includes an elongate strip of material having first and second ends and a bend section between the first and second ends. The elongate strip is configured for mounting to a mower deck so as to position the bend section over at least a portion of trim surface of the mower deck. The mower deck bumper is configured to absorb forces when brought into contact with an object that would otherwise contact the trim surface.

Another aspect of the invention relates to a method of protecting an exposed surface of a mower deck with a mower deck bumper. The method includes forming the mower deck bumper with a bend section between first and second ends of the mower deck bumper, and securing at least one end of the mower deck bumper to the mower deck so as to position the bend section adjacent to a trim surface of the mower deck. The mower deck bumper, when mounted to the mower deck, is configured and arranged to engage objects in close proximity to the mower deck that would otherwise contact the trim surface.

A further object of the invention relates to a mower assembly that includes a mower deck having a trim surface, and mower deck bumper having first and second ends and a bend section. The mower deck bumper is configured to be coupled to the mower deck with the bend section covering at least a portion of the trim surface, and arranged to engage objects in close proximity to the mower deck that would otherwise contact the trim surface.

A still further aspect of the invention relates to a mower deck bumper kit that includes a package, a mower deck bumper positioned within the package, and a fastener positioned within the package and configured to secure the mower deck bumper to a mower deck. The mower deck bumper includes a flexible bend section and is configured for mounting to a mower deck to cover at least a portion of a trim surface of the mower deck.

The above summary of the present invention is not intended to describe each disclosed embodiment or every implementation of the present invention. Figures in the detailed description that follow more particularly exemplify embodiments of the invention. While certain embodiments will be illustrated and describing embodiments of the invention, the invention is not limited to use in such embodiments.

BRIEF DESCRIPTION OF THE DRAWINGS

The invention may be more completely understood in consideration of the following detailed description of various embodiments of the invention in connection with the accompanying drawings, in which:

FIG. 2 is a top perspective view of another exemplary mower deck bumper according to principles of the present invention mounted to a mower deck; and FIG. 3 is a top perspective view of the mower deck bumper shown in FIG. 2 engaging an object.

Figure 1:
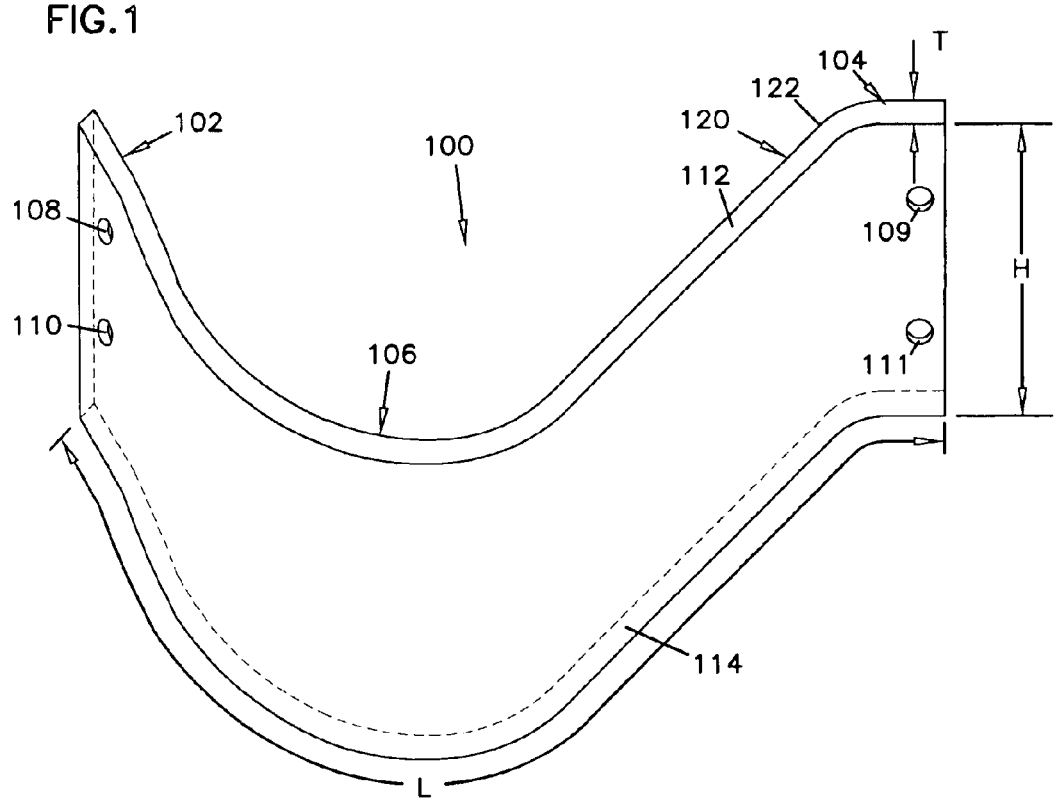
FIG. 1 is a top perspective view of one example of a mower deck bumper according to principles of the present invention.

While the invention is amenable to various modifications and alternate forms, specifics thereof have been shown by way of example and the drawings, and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION OF THE PREFERRED EMBODIMENT

The present invention relates to bumper structures for use with yard equipment such as a lawn mower. The bumper structure may be secured to a mower deck of the lawn mower and may include an elongate strip of material having first and second ends and a flexible bend section. At least the one end of the bumper is capable of being secured to a mower deck so as to position the bend section over at least a portion of a trim surface of the mower deck. When mounted to the mower deck, the bumper is capable of engaging objects that would otherwise engage the trim surface of the mower deck and cause damage to or leaving marks on either the object or the trim surface.

One example of a mower deck bumper 100 of the present invention is illustrated in FIG. 1. Bumper 100 is generally made from a strip of flexible, resilient material having a thickness T and a height H. A length L of bumper 100 extends between a first end 102 and a second end 104. Bumper 100 also includes a bend section 106 between the first and second ends 102, 104. Bumper 100 further includes an upper edge 112 and a lower edge 114 and a curved portion 120 near second end 104 that defines a contact point 122.

Bumper 100 may be generally shaped like a leaf spring, whereby bend section 106 provides compliance of the bumper when the bumper engages a foreign object. More generally, a bumper of the present invention has a curvilinear shape without any sharp or protruding edges at an expected point of contact with a foreign object, and preferably includes a flat or curved surface at the expected point of contact to facilitate movement of the object past the mower deck.

Typically, at least one of the first and second ends 102, 104 is secured to the mower deck. In one embodiment, only one end is secured while the other end is free to move relative to the mower deck when the bend section is flexed due to contact of the bumper with a foreign object. For example, first end 102 may be secured to a mower deck while the second end 104 contacts and moves relative to the mower deck at contact point 122. In another embodiment, both ends 102, 104 are secured to the mower deck and compliance of the bumper is provided solely by the bend section compliance and resilience. Bumper 100 may also include apertures 108, 110 formed in the first end 102 and apertures 109, 111 formed in the second end 104 such that bumper 100 may be secured to the mower deck using some type of fastener that extends through apertures 108–111. Other embodiments may use other means of securing the bumper 100 to a mower deck.

FIGS. 2 and 3 illustrate a mower deck bumper 200 mounted to an example mower deck 220 of a mower vehicle 221. Mower deck 220 includes a trim surface 222 extending around an exterior exposed surface of mower deck 220, a front edge 224 and a rear edge 226. Preferably, a front end 202 of bumper 200 is secured at front edge 224, and a second end 204 of bumper 200 extends along trim surface 222 near rear edge 226. A top edge 212 of bumper 200 may be aligned substantially level with a top surface 228 of mower deck 220. A bottom edge 214 of bumper 200 is preferably aligned level to a bottom edge (not clearly shown) of mower deck 220.

FIG. 2 shows bumper 200 in an uncompressed state and mounted to mower deck 220 in such a way as to cover and protect exposed surface 222 from damage when contacting an object 240. When in the uncompressed state shown in FIG. 2, bend section 206 of bumper 200 is spaced apart from trim surface 222 of mower deck 220, thereby providing space for the bend section 206 to flex and bend when brought into contact with object 240. Second end 204 of bumper 200 is not secured to mower deck 220 so that it can move relative to mower deck 220 when bumper 200 is compressed at bend section 206. In other embodiments, the bumper 200 may be secured to the mower deck 220 at only the second end 204, and in other embodiments both the first and second ends 202, 204 may be secured to mower deck 220 while providing the same or similar advantages to the bumper 200 illustrated in FIGS. 2 and 3 that are secured at only the first end 202.

FIG. 3 illustrates bumper 200 in a compressed state having been brought into contact with object 240. The bend section 206 shown in FIG. 3 is moved toward trim surface 222 and the unattached second end 204 has moved longitudinally along trim surface 222 toward rear edge 226. Because of the material properties and configuration of bumper 200, both the exposed trim surface 222 and the object 240 are protected from damage that otherwise may have occurred if trim surface 222 had been brought into direct contact with object 240.

An exemplary material that would provide the material properties and characteristics advantageous for a bumper of the present invention is ultra high molecular weight polyethylene (UHMW-PE), with a thickness of about ¼ to ½ inches, a height of about 4 to 6 inches, and a length of about 15 to 30 inches. In one embodiment configured for use with a 52 inch mower deck, the bumper has a thickness of about ⅜ inch, a height of about 5 inches, and a length of about 21 inches.

Other types of materials may be suitable for the bumper, such as, for example, polymers, rubber, sheet metal, composites, and like materials having comparable properties of, for example, strength, durability, and flexibility. The material used for the bumper is also preferably resistant to leaving markings to either the foreign object or the trim surface of the mower deck when the foreign object is contacted. Depending on the type of material chosen, the thickness and shape of the material may vary greatly.

When using an UHMW-PE material, it may be advantageous to drape form the bumper on a tool to give it the required shape for a given mower deck design. The height of the bumper preferably matches a height of the mower deck measured at the trim surface between the upper surface and the lower edge of the mower deck, but may be any desired height required to perform the intended function. The length of the bumper may also vary significantly depending on a design of the mower deck and the amount of trim surface exposed to possible contact with an object. For example, a mower deck that includes a trim surface that extends along the sides and front of the mower deck may require a single, very long bumper, or may require multiple bumper sections that are secured to the mower deck at various locations so as to provide the necessary protection of the trim surface and protection against the objects that may be contacted by the mower deck trim surface.

A mower deck bumper of the present invention may be included as part of a kit that includes a bumper and fasteners that are held within a package. The fasteners of the kit may be used to secure the bumper to a mower deck for the purpose of protecting an exposed trim surface of the mower deck from damage when brought into contact with an object. The kit may provide a general bumper configuration that may be retrofit to an existing mower deck, or may be pre-designed for a specific mower deck. The bumper may be included as an attachment for a mower either with the mower or as an after market product that can be mounted to the mower by a consumer as an option feature. In other embodiments, the bumper may be mounted on the mower deck during manufacturing and assembly of the mower deck. In yet further embodiments, the mower deck and bumper may be made from the same or similar materials and integrally formed together as a single piece during a manufacturing process such as, for example, a molding or casting process.

The bumper of the present invention may be configured for use on larger mower units besides the unit shown in FIGS. 2 and 3, such as, for example, commercial mowers, brushers, and agricultural related mowers, or small mower units such as common push mowers used by homeowners. The bumper of the present invention may also be adapted for use with other types of yard equipment such as, for example, edgers, fertilizer machines, mulchers, blowers, thatchers, and aerators that include an exposed contact surface.

A method of using a bumper of the present invention to protect an exposed surface of a mower deck with a mower deck bumper may include forming the mower deck bumper with a bend section between first and second ends of the mower deck bumper, and securing at least one end of the mower deck bumper to the mower deck so as to position the bend section adjacent to a trim surface of the mower deck. The mower deck bumper, when mounted to the mower deck, is configured and arranged to engage objects in close proximity to the mower deck that would otherwise contact the trim surface. The securing step of the method may also include securing the first and second ends of the mower deck bumper to the mower deck. The forming step of the method may also include pre-forming the bend section using a drape molding process or forming the mower deck bumper from an ultra high molecular weight polyethylene (UHMW-PE) material. The forming step may also include forming a curved contact surface at the second end of the mower deck bumper, and the securing step includes securing the first end to the mower deck so as to contact the curved surface with the trim surface of the mower deck.

The present invention should not be considered limited to the particular examples or materials described above, but rather should be understood to cover all aspect of the invention as fairly set out in the attached claims. Various modifications, equivalent processes, as well as numerous structures to which the present invention may be applicable will be readily apparent to those of skill in the art to which the present invention is directed upon review of the instant specification.

We claim:

1. A mower assembly, comprising:

a mower deck having a trim surface; and a mower deck bumper having first and second ends and a bend section, the first end of the mower deck bumper being coupled to the mower deck, the bend section covering at least a portion of the trim surface, and the second end of the mower deck bumper maintaining sliding engagement with the mower deck;

wherein the mower deck bumper is configured and arranged to engage objects in close proximity to the mower deck that would otherwise contact the trim surface, and the second end of the mower deck bumper is configured to slide relative to the mower deck while maintaining contact with the mower deck when the mower deck bumper engages the objects.

2. The mower assembly of claim 1, wherein the bend section is spaced apart laterally from the trim surface.

3. The mower assembly of claim 1, wherein the trim surface is oriented substantially vertically and the mower deck bumper is aligned substantially parallel to the trim surface.

4. The mower assembly of claim 1, wherein the mower deck includes a side edge defining an outer most side of the mower, and the mower deck bumper is coupled to the side edge.

5. The mower assembly of claim 1, wherein the first end of the mower deck bumper is coupled to the mower deck.

6. The mower assembly of claim 1, wherein the second end of the mower deck bumper includes a first portion that maintains contact with the mower deck, and a second portion that extends away from and is not in contact with the mower deck.

7. The mower assembly of claim 1, wherein the bend section is resilient.

* * * * *